(12) United States Patent
Nakata et al.

(10) Patent No.: US 6,780,264 B2
(45) Date of Patent: Aug. 24, 2004

(54) METHOD AND APPARATUS FOR WELDING SYNTHETIC RESIN MEMBER BY HIGH FREQUENCY OR ULTRASONIC HEATING

(75) Inventors: Yoshifumi Nakata, Toyama (JP); Osamu Igarashi, Toyama (JP); Michio Ito, Toyama (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 10/299,686

(22) Filed: Nov. 20, 2002

(65) Prior Publication Data

US 2003/0098331 A1 May 29, 2003

(30) Foreign Application Priority Data

Nov. 27, 2001 (JP) .................................... P2001-361182

(51) Int. Cl.[7] .............................................. B29C 65/08
(52) U.S. Cl. ..................... 156/64; 156/73.1; 156/359; 156/498; 156/580.1; 156/580.2
(58) Field of Search ........................ 156/64, 73.1, 359, 156/498, 499, 580, 580.1, 580.2, 583.1

(56) References Cited

U.S. PATENT DOCUMENTS

| | | | |
|---|---|---|---|
| 3,438,428 A | | 4/1969 | Balamuth et al. |
| 3,529,660 A | * | 9/1970 | Obeda ........................ 165/47 |
| 4,419,169 A | | 12/1983 | Becker et al. |
| 4,426,244 A | * | 1/1984 | Wang ........................ 156/498 |
| 4,529,115 A | | 7/1985 | Renshaw et al. |
| 5,318,420 A | * | 6/1994 | Blaimschein ............. 425/174.2 |
| 5,397,407 A | * | 3/1995 | D'Addario .................. 156/73.1 |
| 5,843,256 A | * | 12/1998 | Han .......................... 156/73.1 |
| 5,902,426 A | * | 5/1999 | Daly .......................... 156/64 |

FOREIGN PATENT DOCUMENTS

| | | |
|---|---|---|
| DE | 42 06 584 A1 | 9/1993 |
| EP | 1110700 A2 | 6/2001 |
| GB | 952042 | 3/1964 |
| JP | 51-7424 | 3/1976 |
| JP | 63-33531 | 9/1988 |

OTHER PUBLICATIONS

European Search Report dated Jan. 23, 2003.

* cited by examiner

*Primary Examiner*—James Sells
(74) *Attorney, Agent, or Firm*—Finnegan, Henderson, Farabow, Garrett, & Dunner, L.L.P.

(57) ABSTRACT

A method for welding synthetic resin members includes the steps of detecting a temperature of a high frequency electrode or an ultrasonic horn (or an anvil) by a temperature detector, cooling the high frequency electrode or the ultrasonic horn (or the anvil) by cooling means when the temperature detected by the temperature detector during a high frequency or ultrasonic vibration exceeds a preset temperature range, thereby reducing the temperature rapidly down to the preset temperature range, and stopping an operation of the cooling means when the temperature of the high frequency electrode or the ultrasonic horn (or the anvil) is reduced to the preset temperature range.

11 Claims, 3 Drawing Sheets

METHOD AND APPARATUS FOR WELDING SYNTHETIC RESIN MEMBER BY HIGH FREQUENCY OR ULTRASONIC HEATING

BACKGROUND OF THE INVENTION

1. Field of the Invention

The present invention relates to a method and apparatus for welding synthetic resin members, for example, by a high frequency vibration or an ultrasonic vibration. More particularly, the present invention relates to a method and apparatus for welding synthetic resin members by a high frequency vibration or an ultrasonic vibration which can carry out efficient welding irrespective of peripheral temperature conditions in a welding operation for a synthetic resin member in which the welding is repeated in a short time.

2. Description of the Related Art

Conventionally, welding has been carried out by utilizing a high frequency wave or an ultrasonic wave in order to stick a film or tape formed of a synthetic resin to an object or to bond sheets formed of a synthetic resin. For example, JP-B-51-7424 has disclosed that a synthetic resin piece is pressurized and welded to a slide fastener chain by an ultrasonic wave or a high frequency wave, thereby forming a stopper portion.

The pressure welding using the high frequency wave or the ultrasonic wave for forming the stopper portion is to be carried out repetitively in a short cycle in order to efficiently produce a slide fastener in large quantities, and furthermore, is to be performed under proper temperature conditions in order to firmly weld a synthetic resin piece to the slide fastener chain. In this connection, a welding time is less than two seconds and a standby time is one second so that one cycle is ended in approximately three seconds in total.

In order to firmly weld a synthetic resin piece to a slide fastener chain in such a short time, a great thermal energy is to be quickly given by an ultrasonic wave or a high frequency wave to a synthetic resin piece, a fastener element, a fastener tape and so forth. By giving the excessive thermal energy, the synthetic resin piece, the fastener element and the fastener tape are overheated. For this reason, they become fragile and the stopper portion is broken when external force such as bending or pushing is applied after welding or thread cutting is caused on the faster tape. On the other hand, if a thermal energy is applied to be reduced, the welding is carried out insufficiently. Consequently, the stopper portion is separated from the slide fastener chain after the welding. Accordingly, a strict temperature management is required for the welding using the ultrasonic wave or the high frequency wave.

In order to execute the temperature management, according to JP-Y-63-33531, for example, a heater and a temperature detector are provided on a cut-off die for guiding a thermoplastic film and a film is welded by means of an ultrasonic horn to form a stopper portion in such a state that the temperature of the film is held into a predetermined temperature by means of a temperature controller. According to the same publication, the temperature of the cut-off die is controlled so that the film is preheated and a time required for applying an ultrasonic energy is shortened. Consequently, a stopper portion forming step is ended in a short time so that the productivity of a slide fastener can be enhanced, and furthermore, the film can be welded without applying an excessive thermal energy by means of the ultrasonic horn. Consequently, the film and the fastener tape can be prevented from becoming fragile.

As described above however, this kind of welding is carried out repetitively for a long time in a short cycle, Therefore, heating is carried out by the heat of the film and the fastener tape which is generated at time of the welding, and the temperature of the ultrasonic horn a high frequency electrode is gradually raised. Even if heat corresponding to an increase in the temperature is naturally discharged into the atmosphere, the horn and the electrode are cooled insufficiently. Accordingly, an excessive thermal energy is gradually applied to the synthetic resin piece, the fastener element and fastener tape so that they are caused to be fragile.

As described in the JP-Y-63-33531, particularly, in the case in which the heater is provided in the cut-off die, the temperature of the ultrasonic horn is greatly raised and special cooling is not carried out. Therefore, there is brought a situation in which the set value of the controlled temperature of the cut-off die by the temperature controller is to be changed during an operation.

SUMMARY OF THE INVENTION

It is an object of the invention to provide a method and apparatus for welding a synthetic resin member by high frequency or ultrasonic heating which can always weld the synthetic resin member at a proper welding temperature without raising the temperature of an ultrasonic horn or a high frequency electrode to a set temperature or more.

The object can be effectively attained by the invention related to a welding method according to first to fourth aspects and the invention related to a welding apparatus according to fifth to ninth aspects. As described in the first aspect, the invention related to the method for welding synthetic resin members by high frequency or ultrasonic heating is mainly characterized by the following steps.

A method for welding synthetic resin embers by high frequency or ultrasonic heating, include the steps of detecting a temperature of a high frequency vibrating portion or an ultrasonic vibrating portion by a temperature detector, cooling one of the high frequency electrodes or either of an ultrasonic horn and an anvil by cooling means when the temperature detected by the temperature detector during a high frequency or ultrasonic vibration exceeds a present temperature range, thereby reducing the temperature rapidly down to the temperature range, stopping an operation of the cooling means when the temperature of the high frequency vibrating portion or the ultrasonic vibrating portion is reduced to the temperature range, and repeating a start and a stop of the cooling means.

The welding method can be suitably carried out by the invention related to the welding apparatus according to the fifth to ninth aspects. As described in the fifth aspect, the invention related to the welding apparatus is mainly characterized by the following structure.

An apparatus for welding synthetic resin members by high frequency or ultrasonic heating comprises a high frequency or ultrasonic vibrator, a high frequency vibrating portion or an ultrasonic vibrating portion which is connected to the vibrator, temperature detecting means provided additionally in the high frequency vibrating portion or the ultrasonic vibrating portion, cooling means for cooling the high frequency electrode or the anvil, and control means for comparing a temperature detected by the temperature detecting means with a set temperature, thereby operating or stopping the cooling means.

A pair of high frequency vibrating portions include upper and lower molds constituted by an electrode connected to the high frequency vibrator or the ultrasonic vibrating portion includes an anvil and an ultrasonic horn connected to the ultrasonic vibrator, and the synthetic resin members to be welded are provided in a lamination state between the upper and lower molds or the ultrasonic horn and the anvil, and the synthetic resin members are welded by pressure. The high frequency vibrator or the ultrasonic vibrator is operated for a predetermined time to weld the synthetic resin members by the internal heating of the synthetic resin members. This operation is repeated continuously. By the repetition of the welding operation, the amount of heat generated during the welding of the synthetic resin members is transferred so that the temperatures of the high frequency electrodes or the ultrasonic horn and the anvil are raised gradually.

At this time, the temperature of the lower mold electrode for supporting the synthetic resin members to be welded in the high frequency electrodes or the ultrasonic horn is always detected by the temperature detecting means, for example. A temperature signal thus detected is sent to the control means to decide whether or not the temperature is present within a preset temperature range. If it is decided that the temperature of the lower mold electrode or the ultrasonic horn is present out of the preset temperature range, a start instruction signal is generated from the control means so that the cooling means starts an operation to positively cool the lower mold electrode or the ultrasonic horn, thereby reducing the temperatures thereof down to the temperature range. When the temperature of the lower mold electrode or the ultrasonic horn enters the temperature range, a stop instruction signal is generated from the control means, thereby stopping the operation of the cooling means.

Thus, when the temperature of the high frequency vibrating portion or the ultrasonic vibrating portion exceeds the predetermined temperature range, the cooling means is operated to positively drop the temperature of the high frequency vibrating portion or the ultrasonic vibrating portion. Consequently, the temperature of the high frequency electrode or the ultrasonic horn (anvil) can be always maintained in a constant range during the operation of the welding apparatus. Thus, the operation for welding the synthetic resin members is always carried out at a proper temperature in a precise time. As a result, a product of high quality can be obtained, and furthermore, a productivity can be enhanced remarkably.

Examples of the cooling means include a cooling jacket provided in the high frequency vibrating portion or the ultrasonic vibrating portion in addition to the spray of cooling air from an air spray nozzle as is defined in a seventh aspect of the invention.

A second aspect of the invention is directed to the method wherein the high frequency vibrating portion or the ultrasonic vibrating portion is preheated to a predetermined temperature which is equal to or lower than the welding temperature of the synthetic resin members by external heating. For the preheating, a sixth aspect of the invention is directed to the apparatus wherein the high frequency vibrating portion or the ultrasonic vibrating portion has preheating means. Preferably, an eighth aspect of the invention is directed to the apparatus wherein an electric heater is employed for the preheating means and is removably attached to the high frequency vibrating portion or the ultrasonic vibrating portion.

By providing the preheating means in the high frequency vibrating portion or the ultrasonic vibrating portion, the temperatures of the synthetic resin members to be welded can be raised previously. Consequently, a high frequency or ultrasonic energy to be applied can be lessened, and furthermore, a welding time can be shortened. Moreover, since the temperature of the vibrating portion can be raised quickly also in a cold district or at time of the starting operation of the apparatus, for example. Therefore, a preparation time can also be shortened at time of the starting operation. In particular, it is preferable that the electric heater should be employed for the preheating means because the temperature is controlled easily. Furthermore, if the electric heater is removably provided in the high frequency vibrating portion or the ultrasonic vibrating portion, the power of the electric heater which is to be applied can be controlled, and furthermore, the amount of heating by the heater can be regulated by adjusting the amount of insertion.

At this time, the preheating temperature is to be set to be lower than the melting temperature of the synthetic resin to be welded. Usually, examples of a synthetic resin material to be used for a slide fastener include polypropylene, polyester, polyamide and polyacetal. In consideration of the melting temperatures of these resins, it is preferable that the preheating temperature should be set to 65 to 90° C. as is defined in a third aspect of the invention.

In a fourth aspect of the invention, the field of use of the synthetic resin member is specified. In particular, one cycle of the welding operation is short, and furthermore, is applied to the formation of the stopper portion of the slide fastener in which a large number of repetitions are carried out, and one of the synthetic resins is a slide fastener chain and the other is a film piece for a stopper.

In the apparatus according to a ninth aspect of the invention, furthermore, a fin, a hole or a concavo-convex portion is provided on the surface of the lower electrode of the high frequency vibrating portion or the ultrasonic horn. Since the fin, the hole or the concavo-convex portion is provided on the surface of the lower electrode or the ultrasonic horn, a contact area with a peripheral atmosphere is increased so that a radiation efficiency can be enhanced. In the case in which the hole or the concavo-convex portion is to be formed, particularly, a heat exchange capability for the inside of the body of the lower electrode or the ultrasonic horn can be enhanced.

DETAILED DESCRIPTION OF THE PREFERRED EMBODIMENTS

Figure 1:
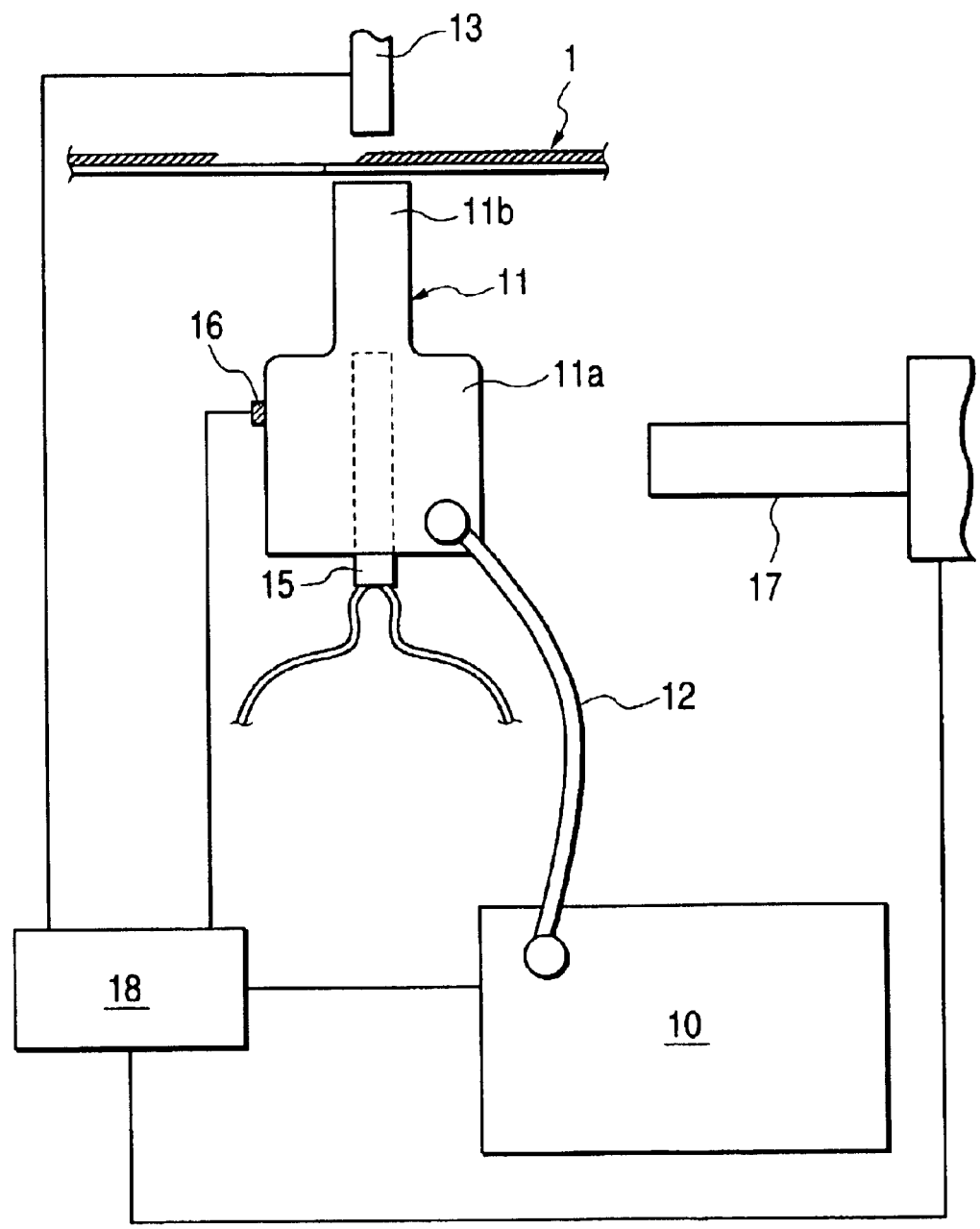
FIG. 1 is a schematic view showing a high frequency welding apparatus of a synthetic resin member according to a typical embodiment of the invention.
Figure 2:
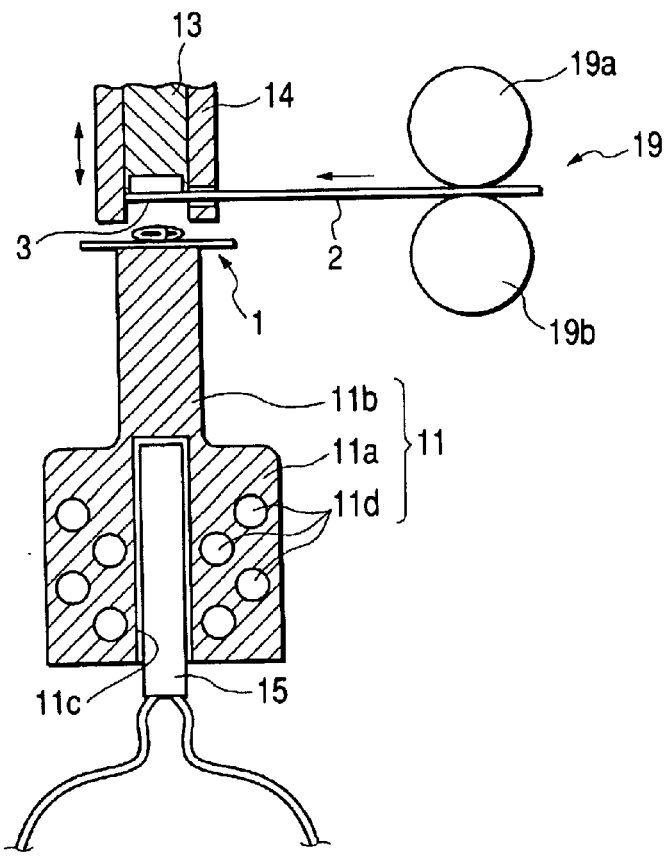
FIG. 2 is a cross sectional view of the apparatus.
Figure 3:
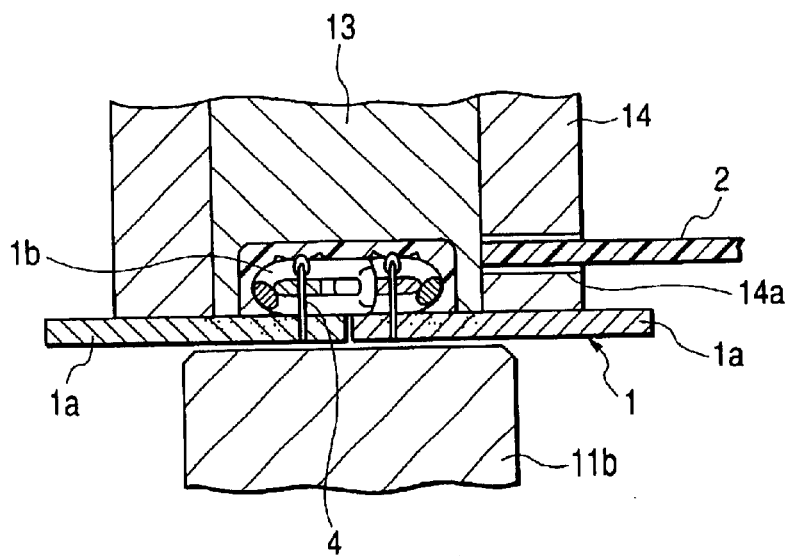
FIG. 3 is a sectional view showing the main part of a welding step in the apparatus.

A preferred embodiment of the invention will e specifically described below with reference to the drawings. FIGS. 1 to 3 are views illustrating the structure of a stopper portion forming device or welding a film piece to be a stopper (lower stopper) to a slide fastener chain by utilizing a high frequency vibration according to a typical embodiment of the invention. FIG. 1 is a schematic view showing the stopper portion forming device, FIG. 2 is a schematic cross sectional view showing the device, and FIG. 3 is a sectional view showing the main part of a welding step in the device.

A fastener chain 1 has such a structure that a fastener element 1b obtained by forming a monofilament made of a synthetic resin like a coil is sewn through a sewing thread 4 along the opposed side edges of a pair of left and right fastener tapes 1a obtained by weaving or knitting. Moreover, the configuration of the fastener chain is not restricted to the embodiment but a coil-shaped fastener element may be woven or knitted simultaneously with the weaving or knitting for the fastener tape.

In these drawings, the reference numeral 11 denotes a lower mold constituted by a lower electrode which is connected to a high frequency vibrator 10, which oscillates a high frequency vibration, through a lead wire 12. The reference numeral 13 denotes a punch provided opposite to the lower electrode 11 and constituted by an upper electrode connected to the high frequency vibrator 10 through a lead wire which is not shown. The punch 13 is vertically moved in a predetermined stroke together with a cut-off die 14 in the same manner as a conventional stopper forming device of this kind and is vertically moved independently together with the cut-off die 14.

The lower mold 11 includes a body 11a having a cubic shape and a column portion 11b protruded upward from the center of the upper surface of the body 11a, and the upper surface of the column portion 11b is provided opposite to the lower surface of the punch 13. A hole 11c for inserting a heater is formed upward in the central part of the lower surface of the body 11a, and a cylindrical electric heater 15 is removably inserted in the heater insertion hole 11c such that an insertion position thereof can be adjusted. A power to be applied to the electric heater 15 may be controlled through a temperature controller which is not shown. Furthermore, the lower body 11a is provided with a radiation passage 11d having a plurality of through holes and blind holes on an opposed surface to an air spray nozzle 17 in a portion provided apart from the heater insertion hole 11c as shown in FIG. 2.

A temperature detector 16 is attached to a part of the side surface of the body 11a in the lower mold 11 and serves to always detect the temperature of the body 11a. Moreover, the air spray nozzle 17 for cooling air is provided toward the body 11a at the side of the body 11a. The temperature detector 16 is connected through a control device 18 to a pneumatic source of the air spray nozzle 17 which is not shown, and the temperature detected by the temperature detector 16 is input as a digital signal to the control device 18 and is operated in a relative operation portion of the control device 18 which is not shown, and is decided to be present in the prestored temperature range or not. If the detected temperature exceeds the temperature range, the pneumatic source is operated so that the cooling air is sprayed from the air spray nozzle 17 toward the body 11a. Moreover, when the detected temperature is present within the temperature range, a stop signal is output from the control device 18 to the pneumatic source so that the spray of the cooling air is stopped.

The temperature range includes a highest temperature and a lowest temperature. The cooling air starts to be sprayed when the temperature of the body 11a exceeds the highest temperature. This spraying of the cooling air is stopped when the temperature of the body 11a becomes lower than the highest temperature and reaches the lowest temperature. When the temperature of the body 11a is in a range between the highest temperature and the lowest temperature, welding of a film piece 3 to the fastener chain 1 is repeated.

Usually, the lower mold 11 is constituted by a solid block member. Even if the cooling air is sprayed from the air spray nozzle 17 toward the body 11a as described above, a cooling speed is low and it is hard to carry out the cooling to a predetermined temperature range in one second, for example, until the film piece 3 to be the stopper piece of a slide fastener is welded to the fastener chain 1 to form a stopper portion and a next welding operation is then performed. In the embodiment, as described above, the radiation passage lid including a plurality of through holes or blind holes is formed on the body 11a to increase a contact area with the cooling air, thereby carrying out smooth cooling down to the predetermined temperature range. The radiation passage lid can also be provided in portions other than the opposed surface to the air spray nozzle 17. Moreover, the configuration is not restricted to the shape of a hole but the surface of the body 11a may be simply processed to have the shape of a concavo-convex portion or a fin.

The cut-off die 14 is provided with an introduction hole 14a for a long continuous tape-shaped film 2 and the tape-shaped film 2 is intermittently supplied to a concave cut portion of the cut-off die 14 through the introduction hole 14a by a necessary length during the welding by means of a feeding device 19 including a pair of feeding rollers 19a and 19b holding the film 2 from above and below. When the tape-shaped film 2 having a predetermined length is supplied to the concave cut portion of the cut-off die 14, the cut-off die 14 is brought down and the punch 13 is subsequently brought down with a predetermined time difference to cut the tape-shaped film 2, thereby forming the film piece 3 for a stopper. The film piece 3 thus cut is brought down with the descent of the punch 13 and is pushed against the upper surface of the lower mold 11 through the stopper forming region of the fastener chain 1 provided in a lower part.

When the film piece 3 is thus set into the stopper forming portion of the fastener chain 1, an operation signal is generated from the control device 18 so that the high frequency vibrator 10 is turned on and is thus operated to apply a high frequency voltage between the lower mold 11 and the punch 13. As shown in FIG. 3, consequently, the stopper forming portion and the film piece 3 are welded to each other by the internal heating of the stopper forming region in the fastener chain 1 and the film piece 3. A time required for the welding is approximately two seconds.

When the welding is ended, the punch 13 is lifted to a predetermined standby position in the concave cut portion of the cut-off die 14. Upon receipt of a signal sent from the control device 18, a feeding mechanism for the tape-shaped film 2 which is not shown is operated so that the tape-shaped film 2 having a predetermined length is introduced into the concave cut portion of the cut-off die 14 through the introduction hole 14a. Subsequently, the same operation as the operation described above is carried out and a next welding operation is performed. At this time, a time taken until the next welding operation is started after the end of the last welding is less than one second. Then, the welding operation is carried out repetitively.

When the welding operation is carried out repetitively, the temperatures of the lower mold 11 and the punch 13 are gradually raised by the internal heat generation of the stopper forming region in the fastener chain 1 and the film piece 3 and the stopper forming region and the film piece 3 are finally brought into an overheat state so that the stopper forming portion is caused to be fragile by the welding operation. In the case in which a heater for preheating is provided in the lower mold 11, particularly, the overheat state is easily brought in an early stage by the heating of the heater. In this case, even if automatic temperature control is carried out by the temperature controller, it is impossible to rapidly cool the lower mold 11 down to a predetermined temperature range when a time taken until the next welding operation is carried out is short as described above.

On the other hand, as in the embodiment, the lower mold 11 is positively cooled by external cooling means. Consequently, the lower mold 11 can be smoothly cooled down to the predetermined temperature range also in a short time as described above. Thus, the stopper forming portion can be prevented from becoming fragile during working for a long time.

With such a structure that the electric heater 15 is removably inserted into the heater insertion hole 11d and a stopper for the electric heater 15 is attached stepwise, for example, to control the amount of the insertion of the electric heater 15 in the embodiment, when the preheating temperature of the lower mold 11 is raised to be a set temperature or more and the cooling cannot be thereby carried out rapidly by only the air spray nozzle 17, the amount of the insertion of the electric heater 15 is controlled so that the preheating temperature can be reduced and the cooling can be carried out effectively by means of the air spray nozzle 17.

Figure 4:
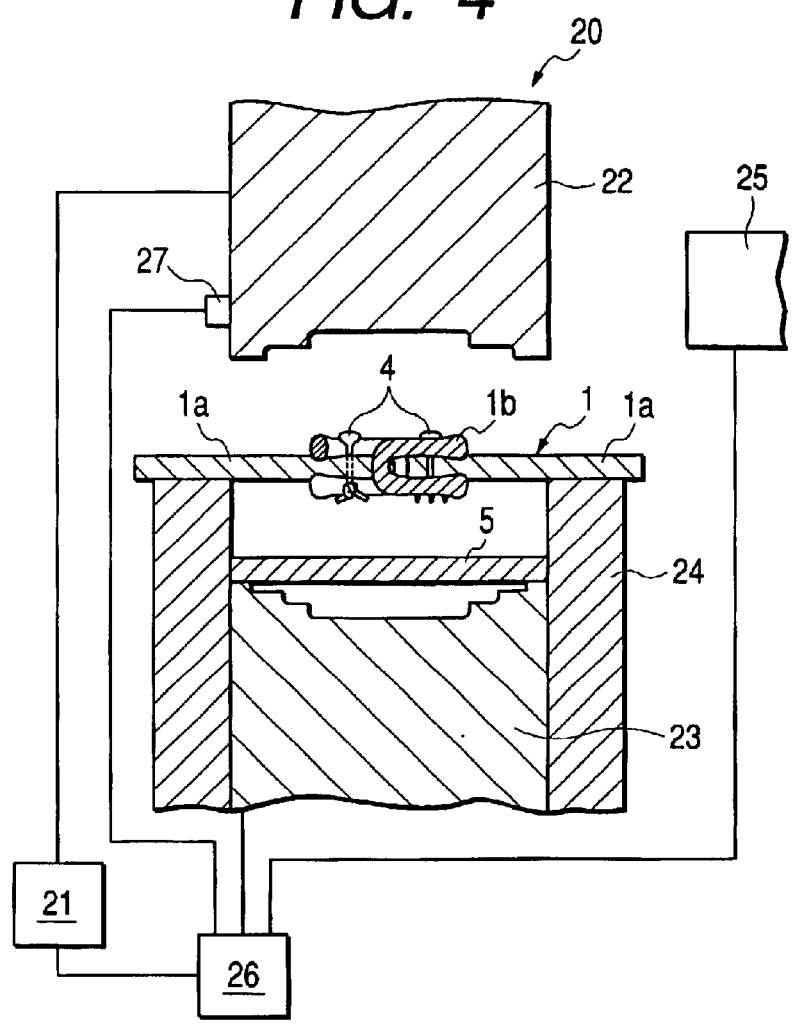
FIG. 4 is a schematic view showing an ultrasonic welding apparatus of a synthetic resin member according to another typical embodiment of the invention.

FIG. 4 schematically shows a second embodiment of the invention. According to the embodiment, the stopper forming region in the fastener chain 1 and the film piece 3 are welded and integrated by an ultrasonic vibration. In FIG. 4, conventional well-known components are not shown and only components provided in portions which are directly related to the invention are schematically shown. In the following description, accordingly, the detailed description of the conventional components will be omitted.

The fastener chain in FIG. 4 has a similar structure to that shown in FIGS. 1 and 2. In the fastener chain 1 shown in FIG. 4, a zigzag fastener element 1b obtained from a monofilament formed of a synthetic resin is sewn through a sewing thread 4 along opposed side edges of pair of left and right fastener tapes 1a obtained by weaving or knitting.

A stopper portion forming device 20 for a slide fastener according to the embodiment includes an ultrasonic vibrator 21, an ultrasonic horn 22 connected to the ultrasonic vibrator 21, an anvil 23 provided below the ultrasonic horn 22, a support table 24 of the fastener chain, an air spray nozzle 25 for cooling air which is provided toward the ultrasonic horn 22, and a control device 26 for controlling the movement of the operating member of the stopper portion forming device 20. The ultrasonic vibrator 21 oscillates an ultrasonic vibration.

The anvil 23 is provided in a guide hole formed in the support table 24 in a vertical direction to be vertically movable. The upper surface of the anvil 23 is set to be a pressing surface having the shape of the lower surface of a stopper portion and the lower surface of the ultrasonic horn 22 is set to be a pressing surface having the shape of the upper surface of the stopper portion. The ultrasonic horn 22 is provided above the anvil 23 to be vertically movable.

A temperature detector 27 is attached to the ultrasonic horn 22, and a temperature detection signal detected by the temperature detector 27 is input to the control device 26 and the detected temperature is compared with a prestored temperature range in the control device. If it is decided that the detected temperature exceeds the temperature range, the driving signal of a driving source such as a fan which is not shown is generated from a control signal and cooling air is sprayed from the air spray nozzle 25 onto the ultrasonic horn 22 so that the horn 22 is cooled positively.

For example, an electric heater is attached and the preheating temperature of the ultrasonic horn 22 is controlled by a power applied to the electric heater or the ON/OFF operation of a power source so that ultrasonic welding can also be carried out by a small ultrasonic energy, which is not shown. In this case, the power source of the electric heater is turned ON/OFF simultaneously with the start/stop of the operation of the ultrasonic vibrator 20, thereby starting/stopping the driving operation of the driving source such as a fan simultaneously with the ON/OFF operation of the power source. At this time, it is preferable that the air spray nozzle 25 should be turned toward the pressing surface of the ultrasonic horn 22 in order to enhance a cooling efficiency.

According to the stopper portion forming device 20 of the slide fastener according to the embodiment which constituted as described above, first of all, the anvil 23 is brought down and the ultrasonic horn 22 is lifted, and a synthetic resin piece 5 is mounted on the anvil 23 in this state. Then, the stopper forming region is set onto the upper surface of the synthetic resin piece 5 such that the surface side of the fastener chain 1 is set to be the anvil 23 side. The anvil 23 is then lifted and the ultrasonic horn 22 is brought down to interpose the synthetic resin piece 5 and the stopper forming region between the anvil 23 and the ultrasonic horn 22 in a lamination state. Then, an ultrasonic wave is applied with pressurization to we the synthetic resin piece 5 to the stopper forming region of the fastener chain 1 by internal heating, thereby forming a stopper portion. By repeating the welding operation while intermittently supplying the fastener chain 1 by predetermined length, the stopper portion in a required region is sequentially form every predetermined length.

Also in the embodiment, the ultrasonic horn 22 is positively cooled by spraying the cooling air from the outside. Even if the welding operation for one cycle is carried out in a short time as described above, therefore, the ultrasonic horn 22 can be cooled rapidly down to the predetermined temperature range. Accordingly, even if the welding operation is repeated for a long time, the stopper forming portion can be prevented from becoming fragile.

Figure 5:
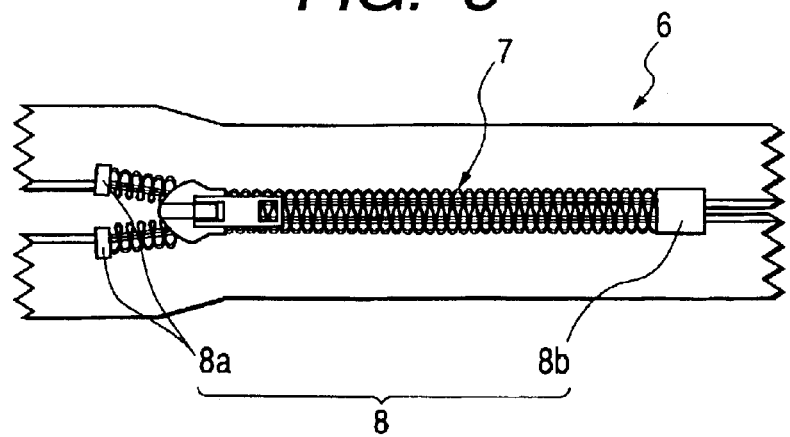
FIG. 5 is a plan view showing a slide fastener provided with a stopper by a high frequency or ultrasonic welding apparatus.

By the high frequency or ultrasonic welding apparatus, as shown in FIG. 5, a stopper portion 8 including an upper stopper 8a and a lower stopper 8b to which the synthetic resin piece or the film piece is welded and which is formed of a synthetic resin is provided on the end of a fastener element line 7 of a slide fastener 6. In some cases, a lamination piece in which nylon, polyester, nylon and denatured polyester is laminated is used for the synthetic resin piece or the film piece.

As described above, according to the method and apparatus for welding a synthetic resin member by a high frequency wave or an ultrasonic wave in accordance with the invention, the invention can produce the following peculiar and great effects.

A difference in a temperature is made between the set temperature of the high frequency vibrating portion or the ultrasonic vibrating portion and the temperature range preset by cooling. Therefore, the error of a preheating temperature is permitted within the difference and rapid cooling can reliably be carried out mainly at time of a rise in the temperature during the operation of the high frequency or ultrasonic vibrator. Consequently, a productivity can be enhanced and a product of high quality can be obtained. In the case in which the air is sprayed for the cooling means, particularly, the high frequency vibrating portion or the ultrasonic vibrating portion can be cooled easily at a low cost. Moreover, a fin, a hole or a concavo-convex portion is formed in the high frequency vibrating portion or the ultrasonic vibrating portion. Consequently, the surface area of the high frequency vibrating portion or the ultrasonic vibrating portion is increased so that heat can easily be radiated from the vibrating portion and a cooling efficiency can further be enhanced.

By preheating the high frequency vibrating portion or the ultrasonic vibrating portion to the preset temperature prior to the execution of the welding, moreover, it is possible to carry out the high frequency or ultrasonic welding smoothly at a proper temperature under constant conditions also in a cold district or the winter season to be a peripheral environment for the execution of the welding, for example. Furthermore, it is possible to carry out the preheating, thereby easily raising the temperature to the set temperature of the high frequency vibrating portion or the ultrasonic vibrating portion.

What is claimed is:

1. A welding method for welding synthetic resin members by one of a high frequency vibration and an ultrasonic vibration, comprising the steps of:

detecting a temperature of a vibrating portion by a temperature detector;

preheating the vibrating portion to a predetermined temperature which is equal to or lower than a welding temperature of the synthetic resin member;

cooling the vibrating portion by a cooling device when the temperature detected by the temperature detector during one of the high frequency vibration and the ultrasonic vibration exceed a preset temperature range, thereby reducing the temperature rapidly down the preset temperature range;

stopping an operation of the cooling device when the temperature of the vibrating portion is reduced to the preset temperature range; and repeating a start and a stop of the cooling device.

2. The welding method according to claim 1, wherein the preheating temperature is 65 to 90° C.

3. The welding method according to claim 1, wherein one of the synthetic resin members is a slide fastener chain and the other is one of a film piece and a synthetic resin piece for a stopper.

4. The welding method according to claim 1, wherein the preset temperature range includes a highest temperature and a lowest temperature, and the cooling device starts to be operated when the temperature exceeds the highest temperature, and the cooling device is stopped when the temperature reaches the lowest temperature.

5. A welding apparatus for welding synthetic resin members by one of a high frequency vibration and an ultrasonic vibration, comprising:

a vibrator which oscillates one of the high frequency vibration and the ultrasonic vibration;

a vibrating portion connected to the vibrator, wherein the vibrating portion includes a preheating device, a temperature detector which detects a temperature of the vibrating portion;

a cooling device which cools the vibration portion; and a controller which compares the temperature detected by the temperature detector with a predetermined temperature, thereby operating or stopping the cooling device.

6. The welding apparatus according to claim 5, wherein the cooling device includes a spray nozzle for cooling air.

7. The apparatus according to claim 5, wherein the cooling device is a cooling jacket provided in the vibrating portion.

8. The welding apparatus according to claim 5, wherein the preheating device is an electric heater inserted into the vibrating portion.

9. The welding apparatus according to claim 5, wherein a plurality of radiation passages are provided on a surface of the vibrating portion, and the radiation passages are formed as at least one of fins, holes and concavo-convex portions.

10. The welding method according to claim 1, wherein the high frequency vibration portion welds the synthetic resin members by applying a high frequency voltage.

11. The welding apparatus according to claim 5, wherein the high frequency vibration has a lower electrode and an upper electrode.

* * * * *

UNITED STATES PATENT AND TRADEMARK OFFICE
CERTIFICATE OF CORRECTION

PATENT NO. : 6,780,264 B2 Page 1 of 1
DATED : August 24, 2004
INVENTOR(S) : Nakata et al.

It is certified that error appears in the above-identified patent and that said Letters Patent is hereby corrected as shown below:

Column 9,
Line 37, "down", should read -- down to --.

Signed and Sealed this

Twenty-first Day of December, 2004

JON W. DUDAS
*Director of the United States Patent and Trademark Office*